United States Patent
Hoshino et al.

(10) Patent No.: US 7,266,346 B2
(45) Date of Patent: Sep. 4, 2007

(54) BASE STATION APPARATUS AND COMMUNICATION TERMINAL APPARATUS

(75) Inventors: Masayuki Hoshino, Yokosuka (JP); Kenichi Miyoshi, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 136 days.

(21) Appl. No.: 10/534,275

(22) PCT Filed: Nov. 10, 2003

(86) PCT No.: PCT/JP03/14245
§ 371 (c)(1),
(2), (4) Date: May 9, 2005

(87) PCT Pub. No.: WO2004/045109
PCT Pub. Date: May 27, 2004

(65) Prior Publication Data
US 2006/0094468 A1 May 4, 2006

(30) Foreign Application Priority Data
Nov. 11, 2002 (JP) ............................ 2002-327221

(51) Int. Cl.
*H04B 1/00* (2006.01)
*H04B 15/00* (2006.01)

(52) U.S. Cl. ............... 455/63.4; 455/504; 455/506; 455/69; 455/70; 455/522

(58) Field of Classification Search ............ 455/562.1, 455/69, 70, 506, 504, 505, 63.4, 226.3, 522; *H04M 1/00*
See application file for complete search history.

(56) References Cited

U.S. PATENT DOCUMENTS

| | | | | |
|---|---|---|---|---|
| 5,583,852 A | * | 12/1996 | Ikeda et al. | 370/335 |
| 6,069,912 A | * | 5/2000 | Sawahashi et al. | 375/142 |
| 6,140,961 A | * | 10/2000 | Takai | 342/367 |
| 2002/0168946 A1 | | 11/2002 | Aizawa et al. | |
| 2003/0169707 A1 | | 9/2003 | Usuda et al. | |

FOREIGN PATENT DOCUMENTS

| | | | |
|---|---|---|---|
| EP | 851609 A2 | * | 7/1998 |
| EP | 1206051 A1 | * | 5/2002 |
| EP | 1496628 | | 1/2005 |
| JP | 2002 26790 | | 1/2002 |
| JP | 2002 320262 | | 10/2002 |
| JP | 2003 259454 | | 9/2003 |
| JP | 2003 298498 | | 10/2003 |

OTHER PUBLICATIONS

M. Sawahashi, et al.: "High-Speed Packet Wireless Access in W-CDMA and Its Radio Link Performance" IEICEB vol. J84-B, No. 10, pp. 1725-1745, Oct. 2001 with partial English translation.
"The Marriage of Smart Antenna Arrays and Multi-Carrier Systems" ISBN 0-7923-7618-8, Nov. 2001, pp. 150-163.
PCT International Search Report dated Feb. 24, 2004.
Japanese Office Action dated Jun. 6, 2006 with English translation.

* cited by examiner

Primary Examiner—Nick Corsaro
Assistant Examiner—Daniel Lai
(74) Attorney, Agent, or Firm—Stevens, Davis, Miller & Mosher, LLP

(57) ABSTRACT

A reception quality reporting system may include a communication terminal that measures reception directivity quality in a quality decision signal received from a base station apparatus. The communication terminal decides a switching timing at which directivities of packet data are switched based on directivity switching timing information communicated by the base station and nullifies the reception quality measured in a period before the switching timing. The communication terminal transmits to the base station apparatus reception quality information indicating the measured reception quality.

7 Claims, 15 Drawing Sheets

BASE STATION APPARATUS AND COMMUNICATION TERMINAL APPARATUS

TECHNICAL FIELD

The present invention relates to a base station apparatus and communication terminal apparatus, and more particularly, to a base station apparatus and communication terminal apparatus that transmit/receive packet data modulated and coded according to channel quality.

BACKGROUND ART

Conventionally, there is a scheme for a base station to use an adaptive array antenna and improve transmission quality through transmission with directivity.

On the other hand, there is also a scheme called "adaptive modulation" in mobile communications under which a modulation/demodulation scheme is adaptively switched according to fluctuations in reception quality caused by fading. Setting an optimum modulation scheme according to a communication environment allows a large volume of packet data to be transmitted at high speed.

When introducing a technology of an adaptive array antenna to a system carrying out adaptive modulation, a communication terminal apparatus measures a reception SIR (ratio of a desired signal to interference signal) using a common pilot signal (CPICH) transmitted with directivity from a base station apparatus as a reference signal. Then, the communication terminal apparatus notifies the base station apparatus of a measured reception SIR. The base station apparatus switches a spreading factor, multi-code multiplexing number, data modulation multi-valued number and error correcting coding rate according to the notified reception SIR and sends packet data to the communication terminal apparatus.

In this case, the base station apparatus performs transmission/reception with a plurality of moving communication terminal apparatuses, and it is often the case that there is a plurality of communication terminal apparatuses requesting reception of high-speed and large-volume packet data over a wide range of area. In order to transmit packet data with directivity to all communication terminal apparatuses requesting reception of high-speed and large-volume packet data, the base station apparatus needs to transmit the packet data by switching between directivities. Therefore, a reference signal used to measure reception quality which is the basis for adaptively modulating packet data needs to be transmitted with directivity to obtain accurate reception quality information. Thus, when the adaptive array antenna technology is introduced to a system carrying out adaptive modulation, the directivity when a reference signal is transmitted and the directivity when packet data is transmitted are switched as appropriate.

However, in the case of a conventional base station apparatus and communication terminal apparatus, it may be necessary to often change directivity control when communication terminal apparatuses exist over a wide range of area and there may exist a time difference in transmission timing between a reference signal and packet data, with the result that although adaptive modulation, etc., is performed based on reception quality measured using the reference signal, the measured reception quality may not be reflected when packet data is actually transmitted with directivity. In this case, even if the modulation multi-valued number and coding rate, etc., are optimized and packet data is transmitted, there may be a situation in which the communication terminal apparatus cannot help but receive the packet data with quality much inferior to the expected quality, being unable to demodulate the packet data or there may also be a situation in which the quality becomes by far better than the expected quality, causing the efficiency of the radio frequency band to decrease, and even if the adaptive array antenna technology is introduced to the system carrying out adaptive modulation, it is not possible to make the most of advantages of both adaptive modulation and adaptive array antenna technology or maximize communication path utilization efficiency.

DISCLOSURE OF INVENTION

It is an object of the present invention to provide a base station apparatus and communication terminal apparatus capable of receiving packet data with high quality, providing high efficiency for a radio frequency band and maximizing communication path utilization efficiency.

This object is attained by the base station apparatus transmitting a reference signal with directivity to a terminal using a common pilot channel, receiving an SIR measured based on the reference signal transmitted from the terminal and controlling based on the received SIR so that directivity is not changed until adaptively modulated and coded packet data is transmitted to the terminal with the same directivity as the directivity with which the reference signal has been transmitted.

BEST MODE FOR CARRYING OUT THE INVENTION

With reference now to the attached drawings, embodiments of the present invention will be explained in detail below.

EMBODIMENT 1

Figure 1:
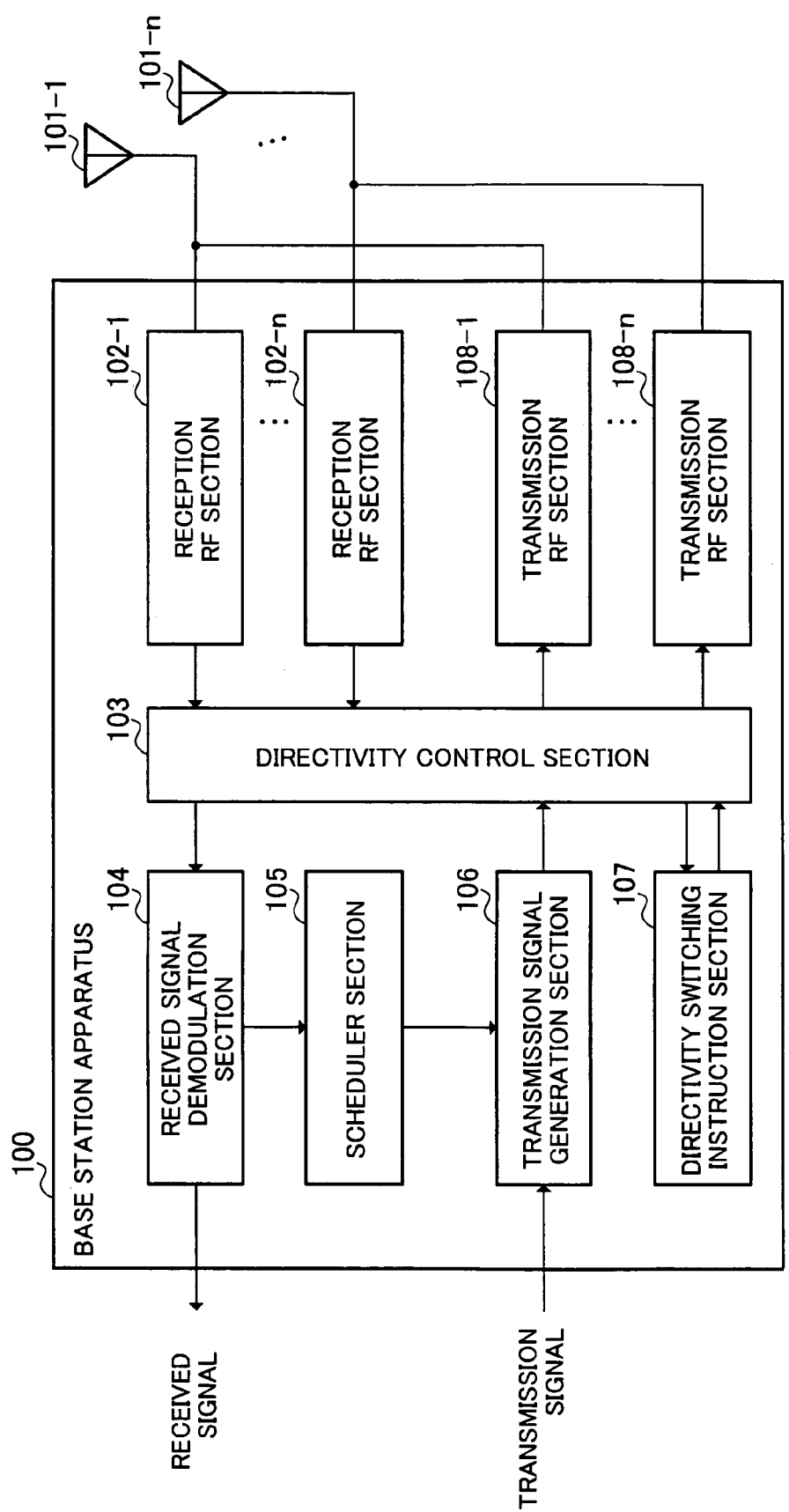
FIG. 1 is a block diagram showing the configuration of a base station apparatus according to Embodiment 1 of the present invention.
Figure 2:
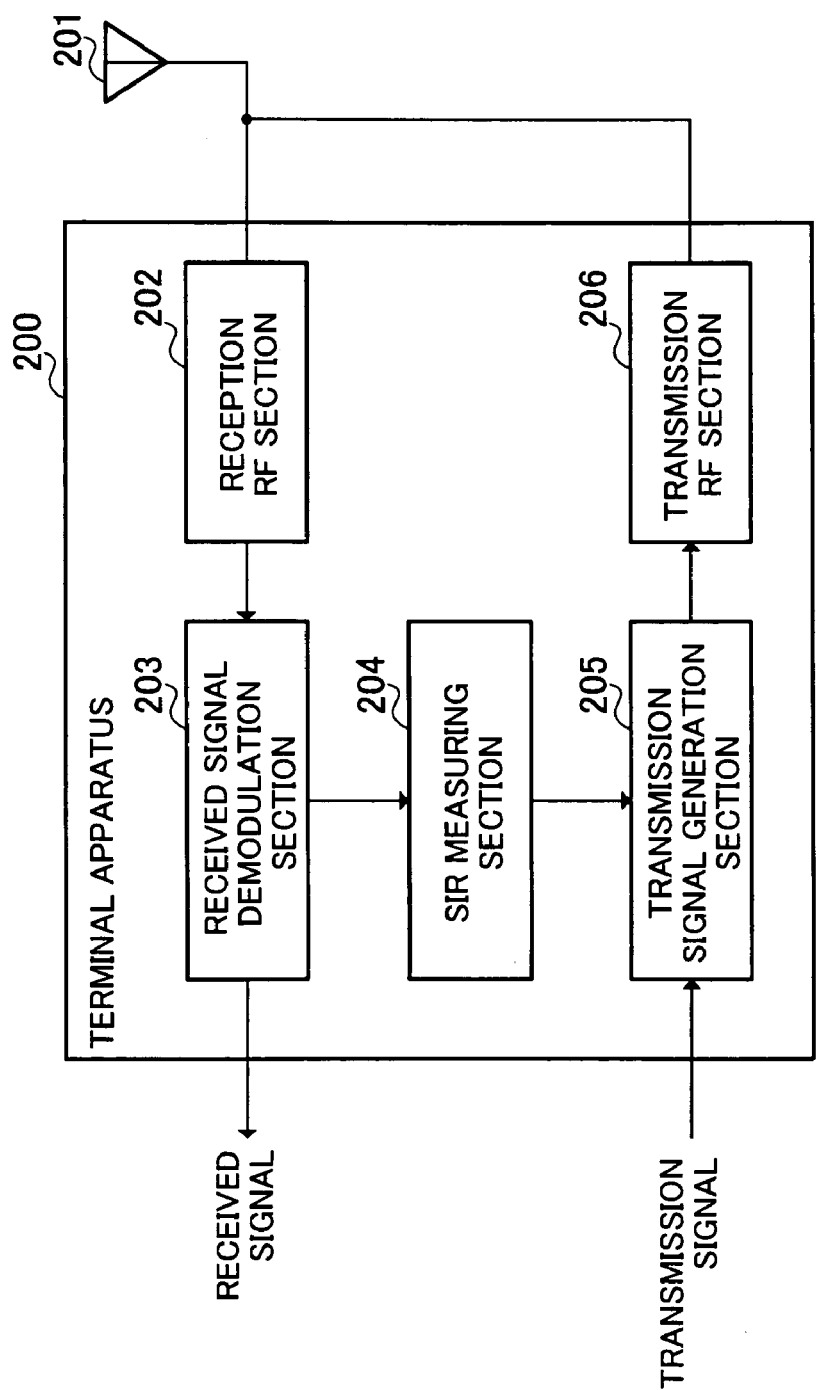
FIG. 2 is a block diagram showing the configuration of a communication terminal apparatus according to Embodiment 1 of the present invention.
Figure 3:
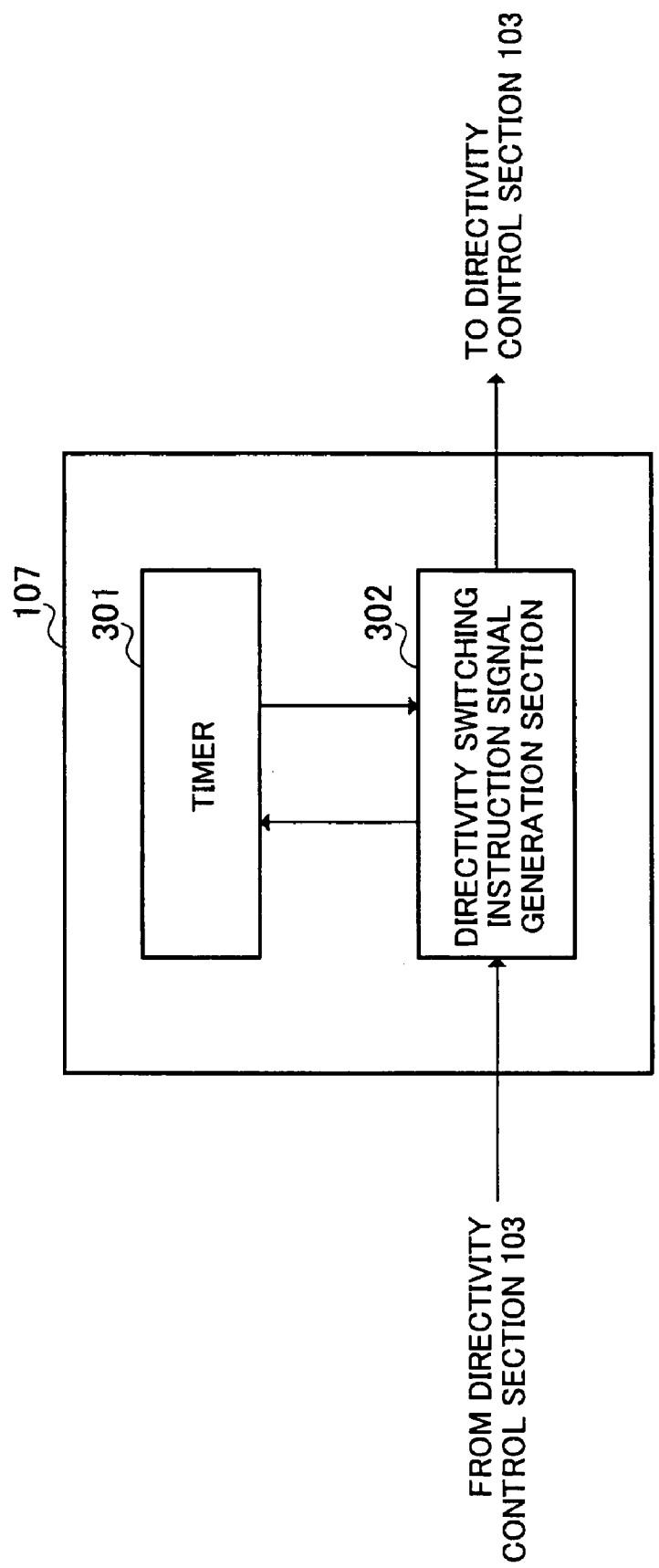
FIG. 3 is a block diagram showing the configuration of a directivity switching instruction section according to Embodiment 1 of the present invention.

FIG. 1 illustrates the configuration of a base station apparatus according to Embodiment 1 of the present invention, FIG. 2 illustrates the configuration of a communication terminal apparatus according to Embodiment 1 of the present invention and FIG. 3 illustrates the configuration of a directivity switching instruction section according to Embodiment 1 of the present invention.

The base station apparatus 100 is mainly constructed of antenna elements 101-1 to 101-n, reception RF sections 102-1 to 102-n, a directivity control section 103, a received signal demodulation section 104, a scheduler section 105, a transmission signal generation section 106, a directivity switching instruction section 107 and transmission RF sections 108-1 to 108-n.

Furthermore, the terminal apparatus 200 is mainly constructed of an antenna element 201, a reception RF section 202, a received signal demodulation section 203, an SIR measuring section 204, a transmission signal generation section 205 and a transmission RF section 206.

There is a plurality of antenna elements 101-1 to 101-n, which receives a signal such as an SIR transmitted from the terminal and outputs the received signal to the reception RF sections 102-1 to 102-n. Furthermore, the antenna elements 101-1 to 101-n send reference signals which are quality decision signals output from the transmission RF sections 108-1 to 108-n through a common pilot channel and send packet data output from the transmission RF sections 108-1 to 108-n through a data channel. When there are more antenna elements 101-1 to 101-n, it is possible to extend the range within which transmission with directivity is possible farther from the base station apparatus.

There are as many reception RF sections 102-1 to 102-n as the antenna elements 101-1 to 101-n and signals input from the respective antenna elements 101-1 to 101-n are subjected to reception processing such as down-conversion and then output to the directivity control section 103.

The directivity control section 103 which is a directional transmission section performs weight control over the received signals input from the plurality of the reception RF sections 102-1 to 102-n using channel estimation and optimum weights, performs processing such as generation of adaptive directivity reception signals and outputs the adaptive directivity reception signals generated, etc., to the received signal demodulation section 104. Furthermore, the directivity control section 103 outputs a transmission signal input from the transmission signal generation section 106 to the transmission RF sections 108-1 to 108-n as a plurality of weight-controlled transmission signals. Furthermore, the directivity control section 103 outputs a transmission termination signal to the directivity switching instruction section 107 after transmitting packet data and before transmitting the next reference signal.

The received signal demodulation section 104 carries out demodulation processing on the adaptive directivity reception signal, etc., input from the directivity control section 103. Furthermore, the received signal demodulation section 104 supplies an SIR measurement result reported from each terminal out of the demodulated signal to the scheduler section 105.

The scheduler section 105 decides which terminal is assigned to the channel for which adaptive modulation is used from the SIR measurement result which is the quality information input from the received signal demodulation section 104 and decides the modulation multi-valued number and coding rate of the signal to the corresponding terminal. The scheduler section 105 then outputs information on the modulation multi-valued number and coding rate to the transmission signal generation section 106.

The transmission signal generation section 106 which is a packet data generation section modulates and codes a transmission signal such as a reference signal or packet data based on the information on the modulation multi-valued number and coding rate input from the scheduler section 105 and outputs the transmission signal to the directivity control section 103 according to the scheduling by the scheduler section 105.

The directivity switching instruction section 107 which is a control section monitors whether a predetermined time has elapsed or not and outputs, when a predetermined time has elapsed and a transmission termination signal is input from the directivity control section 103, an instruction signal for switching between directivities to the directivity control section 103. The directivity switching instruction section 107 will be explained more specifically later.

The transmission RF sections 108-1 to 108-n apply up-conversion processing, etc., on the respective weight-controlled transmission signals input from the directivity control section 103 and then transmits transmission signals through the corresponding antenna elements 101-1 to 101-n Next, the configuration of the terminal apparatus 200 will be explained using FIG. 2.

The reception RF section 202 applies reception processing such as down-conversion processing on the received signal input from the antenna element 201 and then outputs the received signal to the received signal demodulation section 203.

The received signal demodulation section 203 carries out predetermined demodulation processing on the received signal input from the reception RF section 202. Furthermore, the received signal demodulation section 203 outputs the reference signal out of the received signal to the SIR measuring section 204.

The SIR measuring section 204 which is a reception quality measuring section measures an SIR based on the reference signal input from the received signal demodulation section 203. The SIR measuring section 204 outputs an SIR measured value indicating the calculated reception quality to the transmission signal generation section 205.

The transmission signal generation section 205 generates a transmission signal including the SIR measured value input from the SIR measuring section 204 and outputs the transmission signal to the transmission RF section 206.

The transmission RF section 206 applies up-conversion processing, etc., to the transmission signal input from the transmission signal generation section 205 and then transmits the transmission signal through the corresponding antenna element 201.

Next, the configuration of the directivity switching instruction section 107 will be explained using FIG. 3. The directivity switching instruction section 107 is mainly constructed of a timer 301 and a directivity switching instruction signal generation section 302.

The timer 301 measures a time and outputs at a predetermined time, a signal indicating that the predetermined time has elapsed to the directivity switching instruction signal generation section 302. Furthermore, when a reset signal is input from the directivity switching instruction signal generation section 302, the timer 301 resets the measured time.

Only when a transmission termination signal is input from the directivity control section 103, the directivity switching instruction signal generation section 302 decides whether a signal indicating that the predetermined time has elapsed has been input from the timer 301 or not, and when the signal has been input, the directivity switching instruction signal generation section 302 outputs an instruction signal for switching between directivities to the directivity control section 103. Furthermore, after outputting the instruction signal to the directivity control section 103, the directivity switching instruction signal generation section 302 outputs a reset signal to the timer 301.

Figure 4:
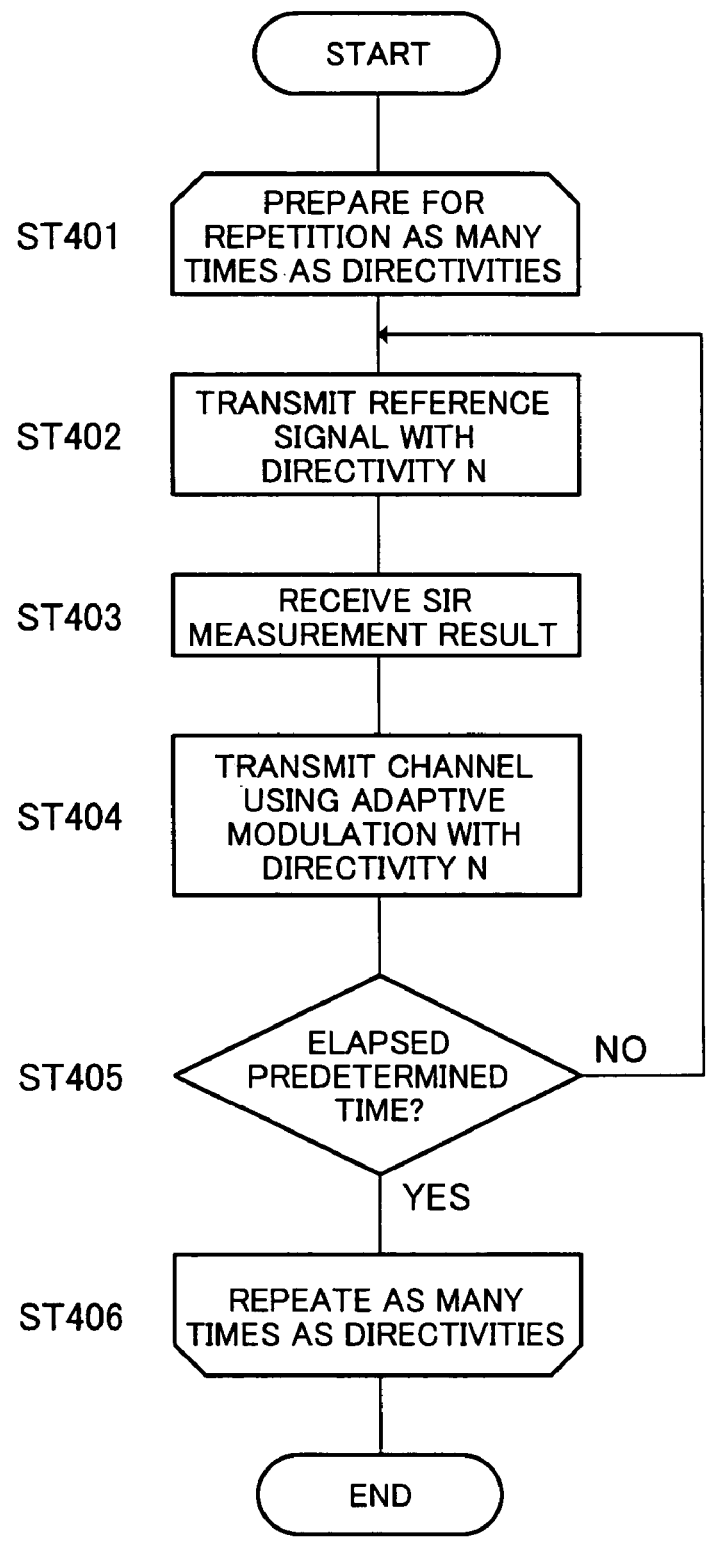
FIG. 4 is a flow chart showing the operation of the base station apparatus according to Embodiment 1 of the present invention.
Figure 5:
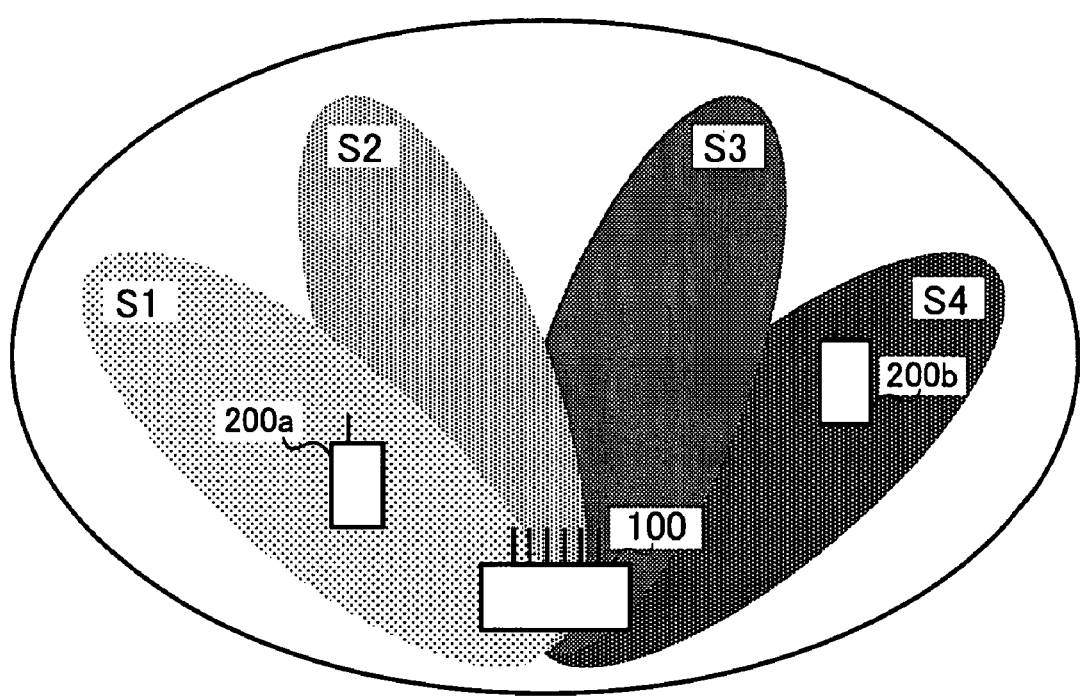
FIG. 5 is a schematic diagram showing a state of transmission with directivity.

Next, the operation of the base station apparatus 100 will be explained using FIG. 4 and FIG. 5. In FIG. 4, a directivity N is any one of directivities S1 to S4. The directivity switching instruction section 107 makes preparations for repeating directivity control processing for the four preset directivities S1 to S4 (step (hereinafter described as "ST") 401).

Next, the directivity control section 103 performs control so as to transmit a reference signal with the directivity S1 and transmits the reference signal with the directivity S1 which is the first directivity through the transmission RF sections 108-1 to 108-n and antenna elements 101-1 to 101-n (ST402).

Next, terminal apparatuses 200a and 200b measure an SIR based on the reference signal transmitted with the directivity S1. Then, the terminals 200a and 200b transmit the measured SIR to the base station apparatus 100. Next, the base station apparatus 100 that has received the SIR extracts the SIR measurement result from the received signal at the received signal demodulation section 104 (ST403).

Next, the base station apparatus 100 transmits packet data with the directivity S1 through a channel for which adaptive modulation is used based on the SIR (ST404).

The timer 301 of the directivity switching instruction section 107 decides whether a predetermined time has elapsed or not (ST405). In the case where the predetermined time has not elapsed, the directivity switching instruction section 107 repeats the processes in ST402 to ST405. On the other hand, in ST405, in the case where the predetermined time has elapsed and it is a time at which directivities can be switched, the directivity is switched to the next directivity S2 and the processes in ST402 to ST405 are repeated (ST406). For the directivity S3 and directivity S4, the processes in ST402 to ST405 will be repeated likewise. The packet data transmitted with the directivity S1 is modulated or coded based on the SIR measurement result obtained by transmitting the reference signal with the same directivity S1, but the present invention is not limited to the case where the reference signal and packet data are transmitted with completely the same directivity S1 and directivities which are different in some degree may also be used within a certain error range if the effect of this embodiment can be at least obtained.

Thus, according to this embodiment, directivities are switched after a lapse of a predetermined time and after packet data is transmitted, and therefore it is possible to use the same directivity for a reference signal and packet data, receive packet data with good quality, enhance the efficiency of a radio frequency band and maximize the communication path utilization efficiency.

EMBODIMENT 2

Figure 6:
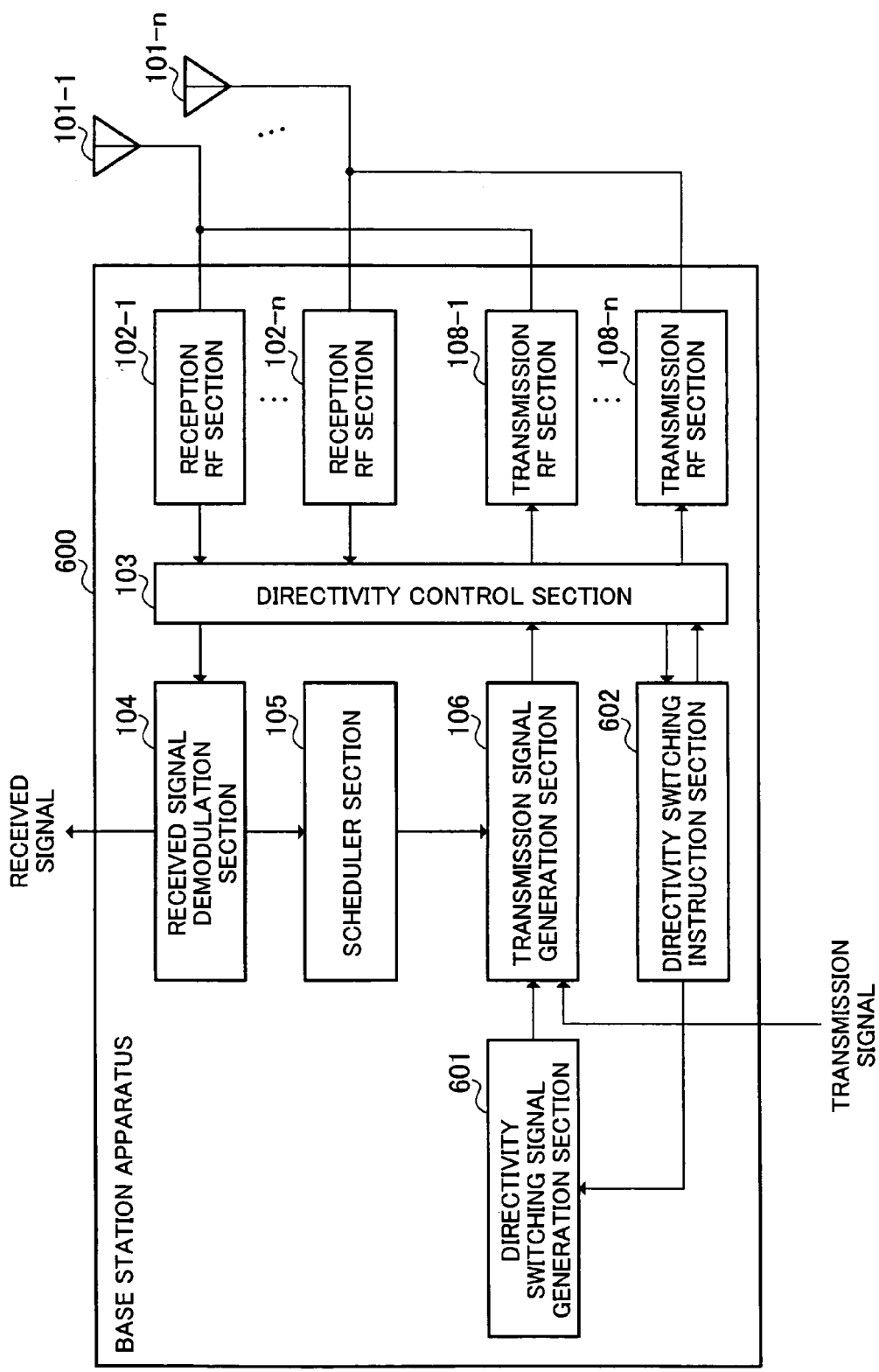
FIG. 6 is a block diagram showing the configuration of a base station apparatus according to Embodiment 2 of the present invention.
Figure 7:
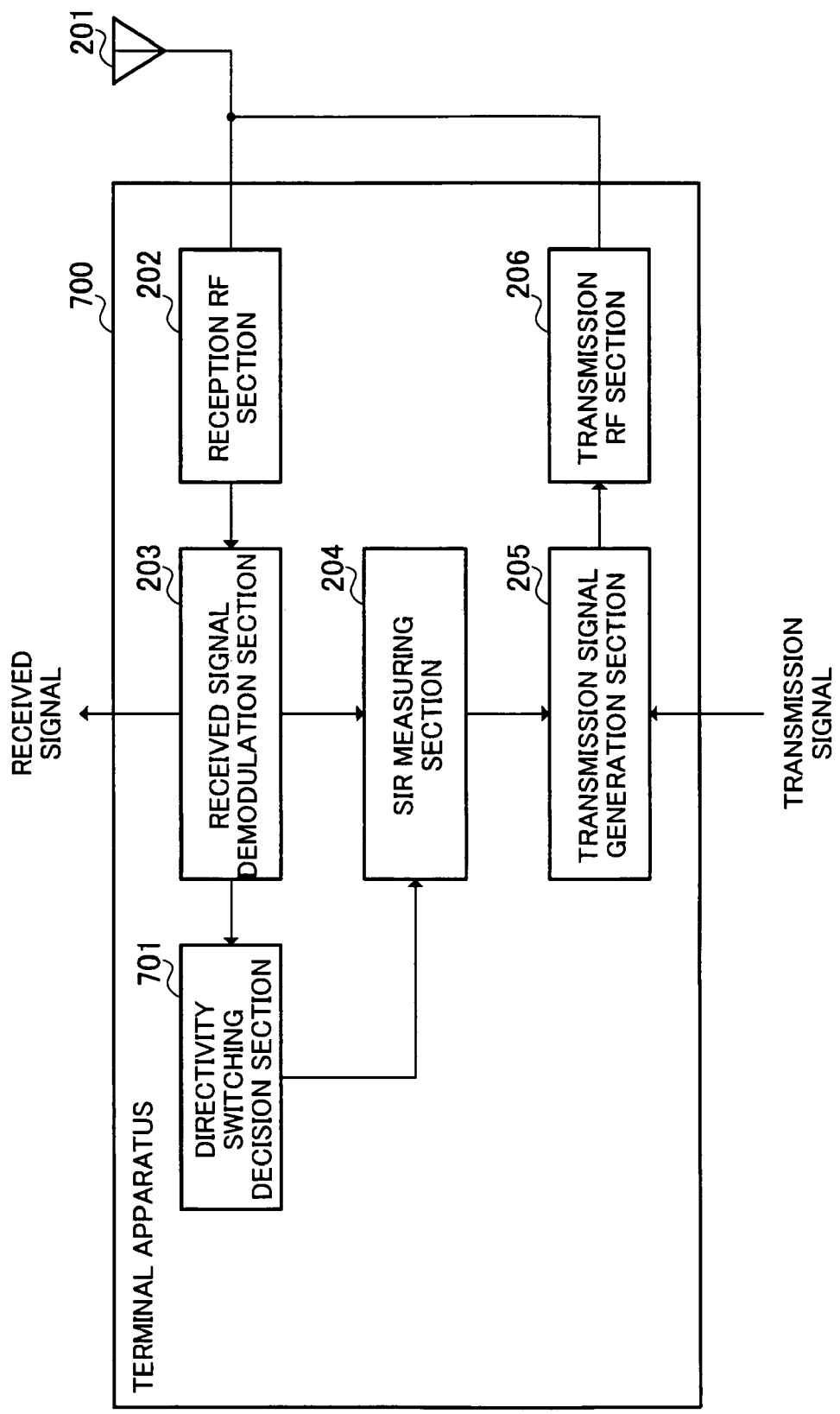
FIG. 7 is a block diagram showing the configuration of a communication terminal apparatus according to Embodiment 2 of the present invention.
Figure 8:
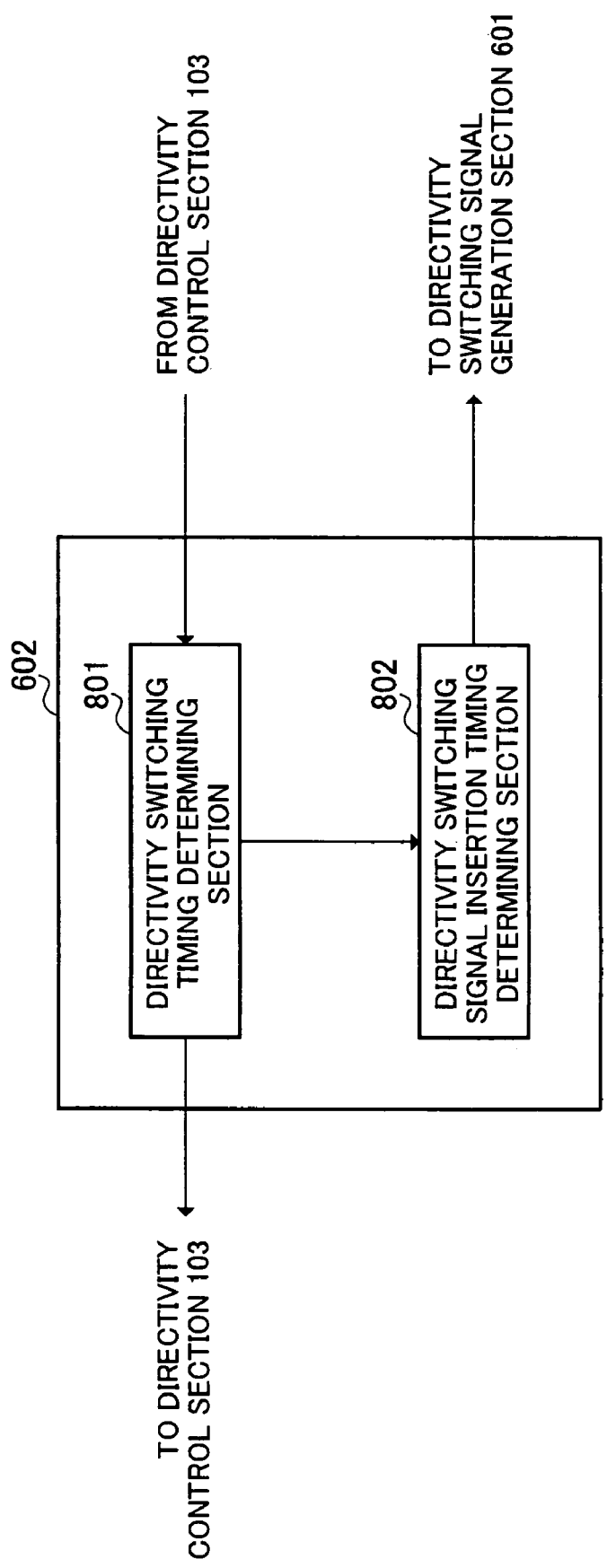
FIG. 8 is a block diagram showing the configuration of a directivity switching instruction section according to Embodiment 2 of the present invention.

FIG. 6 illustrates the configuration of a base station apparatus according to Embodiment 2 of the present invention, FIG. 7 illustrates the configuration of a communication terminal apparatus according to Embodiment 2 of the present invention and FIG. 8 illustrates the configuration of a directivity switching instruction section according to Embodiment 2 of the present invention. This embodiment is characterized in that a base station apparatus notifies a terminal of a timing for switching between directivities. This embodiment differs in FIG. 6 from the embodiment in FIG. 1 in the configuration that a directivity switching signal generation section 601 is provided and differs in FIG. 7 from the embodiment in FIG. 2 in the configuration that a directivity switching decision section 701 is provided. The same components as those in FIG. 1 and FIG. 2 are assigned the same reference numerals and explanations thereof will be omitted.

A transmission signal generation section 106 modulates a transmission signal such as packet data or a reference signal including a directivity switching signal input from the directivity switching signal generation section 601 and then outputs the transmission signal to a directivity control section 103.

The directivity switching signal generation section 601 which is a notification section generates a directivity switching signal based on timing information for inserting a directivity switching signal input from a directivity switching instruction section 602 and outputs the directivity switching signal to the transmission signal generation section 106 which is a transmission section. The directivity switching signal which is directivity switching timing information is a signal for notifying a terminal of a switching timing at which directivities are switched, that is, the timing of the slot following the slot including the directivity switching signal. The terminal which has received this directivity switching signal can know the timing at which the directivity with which packet data is transmitted is switched from a directivity S1 which is a first directivity to a directivity S2 which is a second directivity. The terminal can know only the timing at which directivity is switched and cannot know to which of directivities S1 to S4 the directivity is changed. Furthermore, it goes without saying that it is possible to select any directivities from among directivities S1 to S4 as directivities before and after switching.

The directivity switching instruction section 602 determines a timing for switching between directivities from the switching information input from the directivity control section 103 and outputs timing information for switching the determined directivity to the directivity control section 103. Furthermore, the directivity switching instruction section 602 determines to insert a directivity switching signal into the slot immediately preceding the slot where the directivity with which packet data is transmitted is changed and outputs information on the timing at which the determined directivity switching signal is inserted to the directivity switching signal generation section 601. The directivity switching instruction section 602 will be explained more specifically later.

When a received signal input from a received signal demodulation section 203 includes a directivity switching signal, the directivity switching decision section 701 which is a transmission control section instructs an SIR measuring section 204 to nullify an SIR measurement result measured based on a reference signal of the slot including the directivity switching signal. On the other hand, when the received signal does not include the directivity switching signal, the directivity switching decision section 701 outputs nothing to the SIR measuring section 204.

When instructed by the directivity switching decision section 701 to nullify the SIR, the SIR measuring section 204 does not output the SIR measurement result to the transmission signal generation section 205. On the other hand, when not instructed by the directivity switching decision section 701 to nullify the SIR, the SIR measuring section 204 outputs the SIR measurement result to the transmission signal generation section 205.

Next, the configuration of the directivity switching instruction section 602 will be explained using FIG. 8. The directivity switching instruction section 602 is mainly constructed of a directivity switching timing determining section 801 and a directivity switching signal insertion timing determining section 802.

The directivity switching timing determining section 801 determines a timing for switching between directivities from the switching information input from the directivity control section 103 and outputs the determined timing information for switching between directivities to the directivity switching signal insertion timing determining section 802.

The directivity switching signal insertion timing determining section 802 determines to insert a directivity switching signal into the slot immediately preceding the slot where directivity is switched based on the timing information for switching between directivities input from the directivity switching timing determining section 801 and outputs timing information on the insertion of the determined directivity switching signal to the directivity switching signal generation section 601. The timing for switching between directivities is not limited to the case of switching between directivities in the slot following the slot including the directivity switching signal, but it can also be such a timing at which directivities are switched a predetermined number of slots after the slot including the directivity switching signal.

Next, the operation of the terminal 700 will be explained using FIG. 9. For example, the terminal 700 that has received a received signal including a reference signal transmitted with a directivity S1 demodulates the received signal at the demodulation section 203 (ST901).

Next, the directivity switching decision section 701 decides whether the received signal includes a directivity switching signal indicating that the directivity is switched from the directivity S1 to directivity S2 (ST902). When the received signal does not include the directivity switching signal, the directivity switching decision section 701 instructs the SIR measuring section 204 to output the SIR measurement result (ST903). On the other hand, in ST902 when the received signal includes the directivity switching signal, the directivity switching decision section 701 instructs the SIR measuring section 204 not to output the SIR measurement result measured using the reference signal transmitted with the directivity S1 (ST904).

Next, when the directivity switching signal is included, the transmission signal generation section 205 generates and transmits a transmission signal not including the SIR measurement result and when the directivity switching signal is not included, the transmission signal generation section 205 generates and transmits a transmission signal including the SIR measurement result (ST905).

Figure 10:
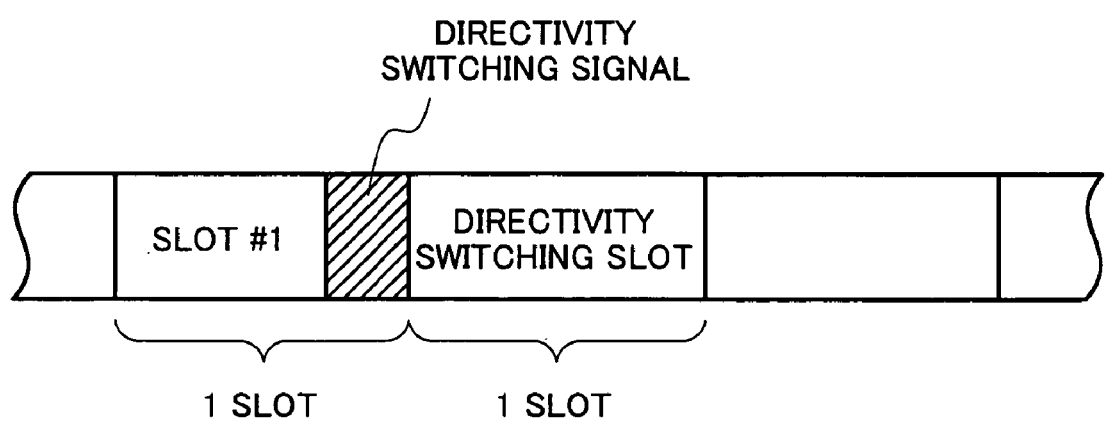
FIG. 10 illustrates a signal according to Embodiment 2 of the present invention.

FIG. 10 shows a transmission signal which includes a reference signal transmitted from the base station apparatus through a common pilot channel on a slot-by-slot basis. A directivity switching signal includes information indicating that directivities are switched in the slot following the slot including the directivity switching signal and instruction information for nullifying an SIR measured based on the reference signal included in slot #1.

Thus, according to this embodiment, by nullifying the SIR measurement result immediately before directivity switching, it is possible to prevent packet data from being adaptively modulated and coded using a wrong SIR measurement result due to directivity switching, receive packet data with good quality, improve the efficiency of a radio frequency band and maximize the communication path utilization efficiency. Furthermore, the terminal can know the timing at which directivities are switched beforehand, and therefore it is possible to prevent SIR measurement results which cannot be used from being transmitted and reduce power consumption. Furthermore, since the reference signal and transmission packet data have different directivities, the terminal nullifies an SIR measured based on a reference signal interfered by transmission packet data having large transmit power, and therefore it is possible to prevent the base station apparatus from adaptively modulating or coding packet data based on an inaccurate SIR measurement result.

EMBODIMENT 3

Figure 11:
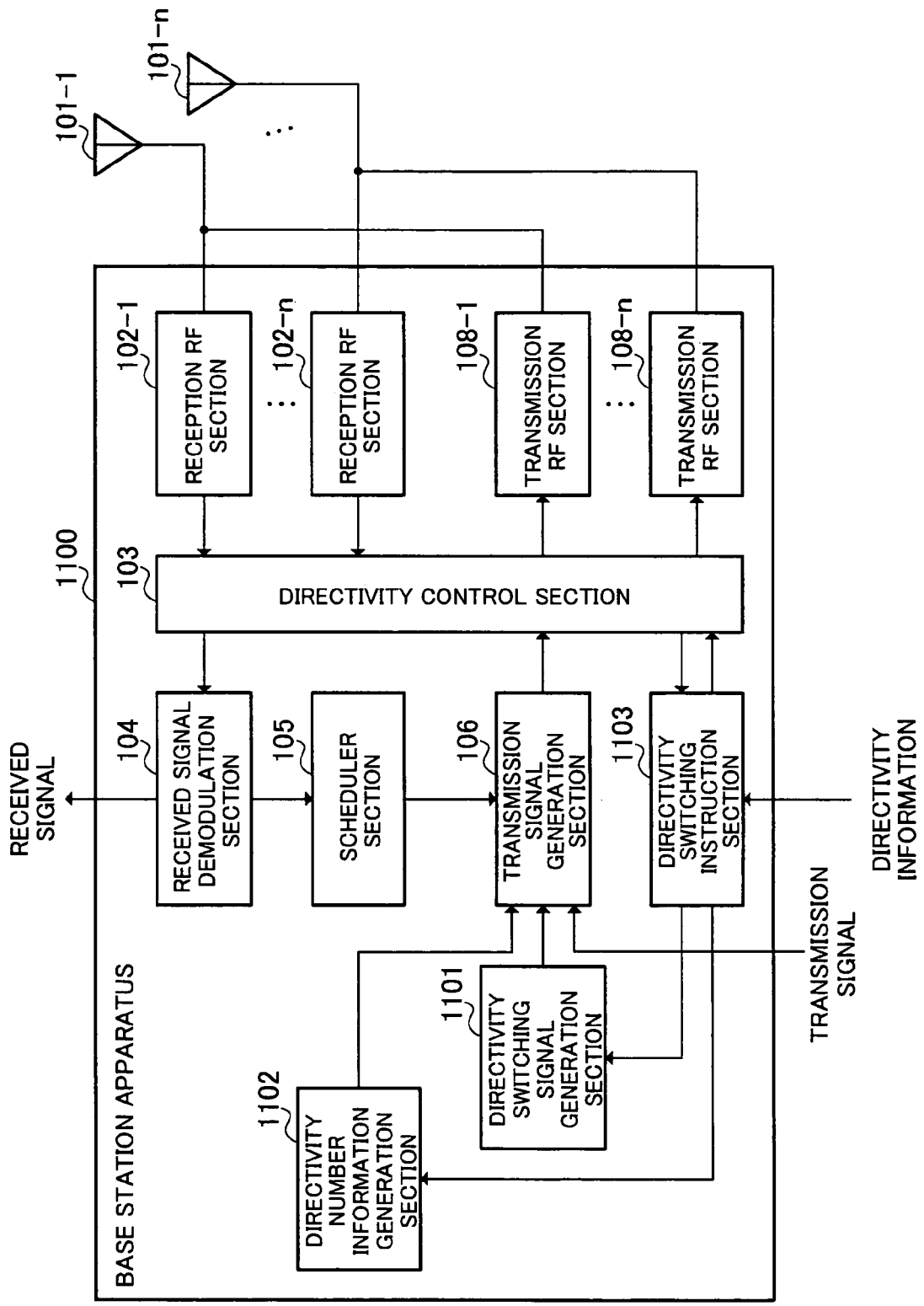
FIG. 11 is a block diagram showing the configuration of a base station apparatus according to Embodiment 3 of the present invention.
Figure 12:
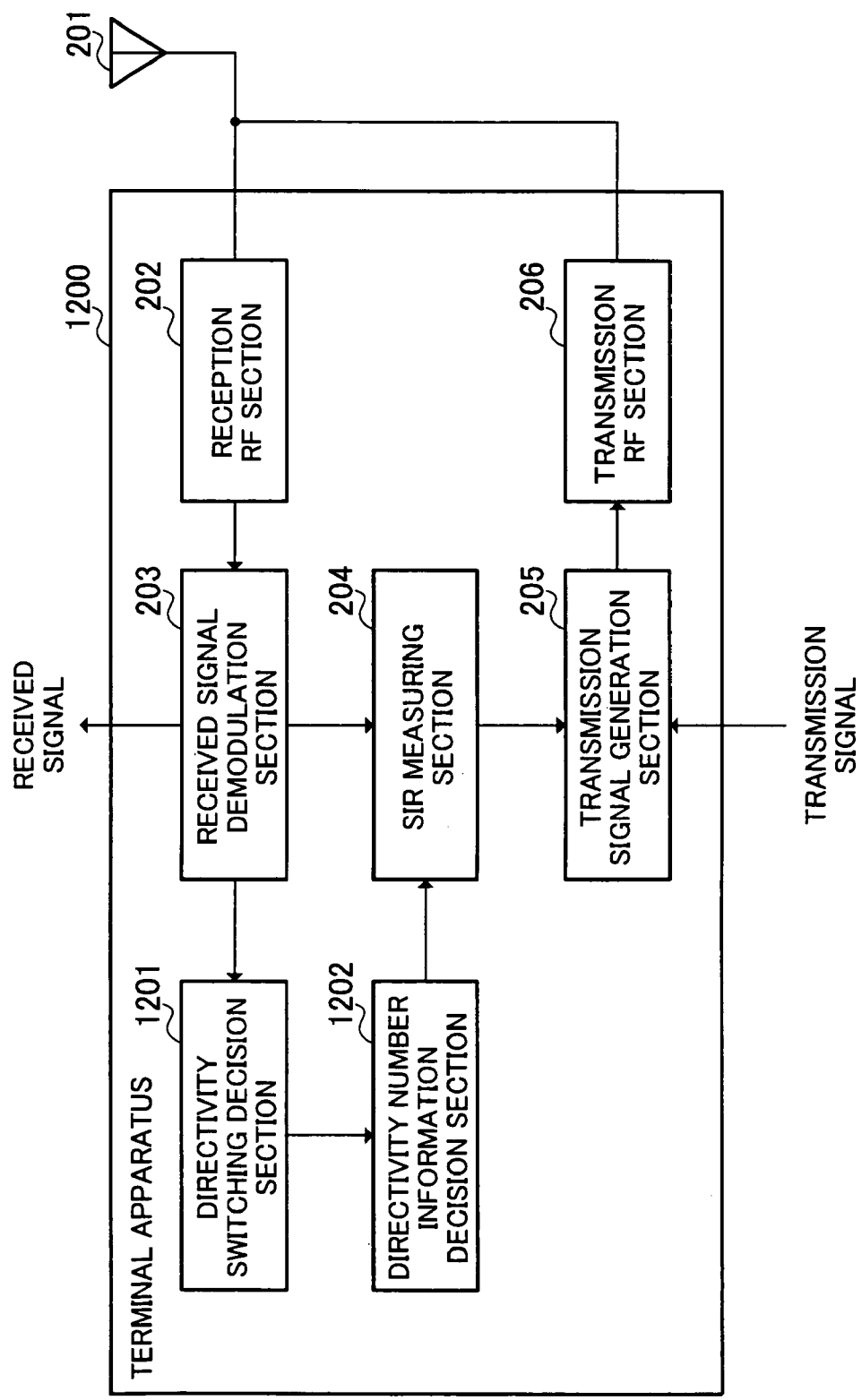
FIG. 12 is a block diagram showing the configuration of a communication terminal apparatus according to Embodiment 3 of the present invention.
Figure 13:
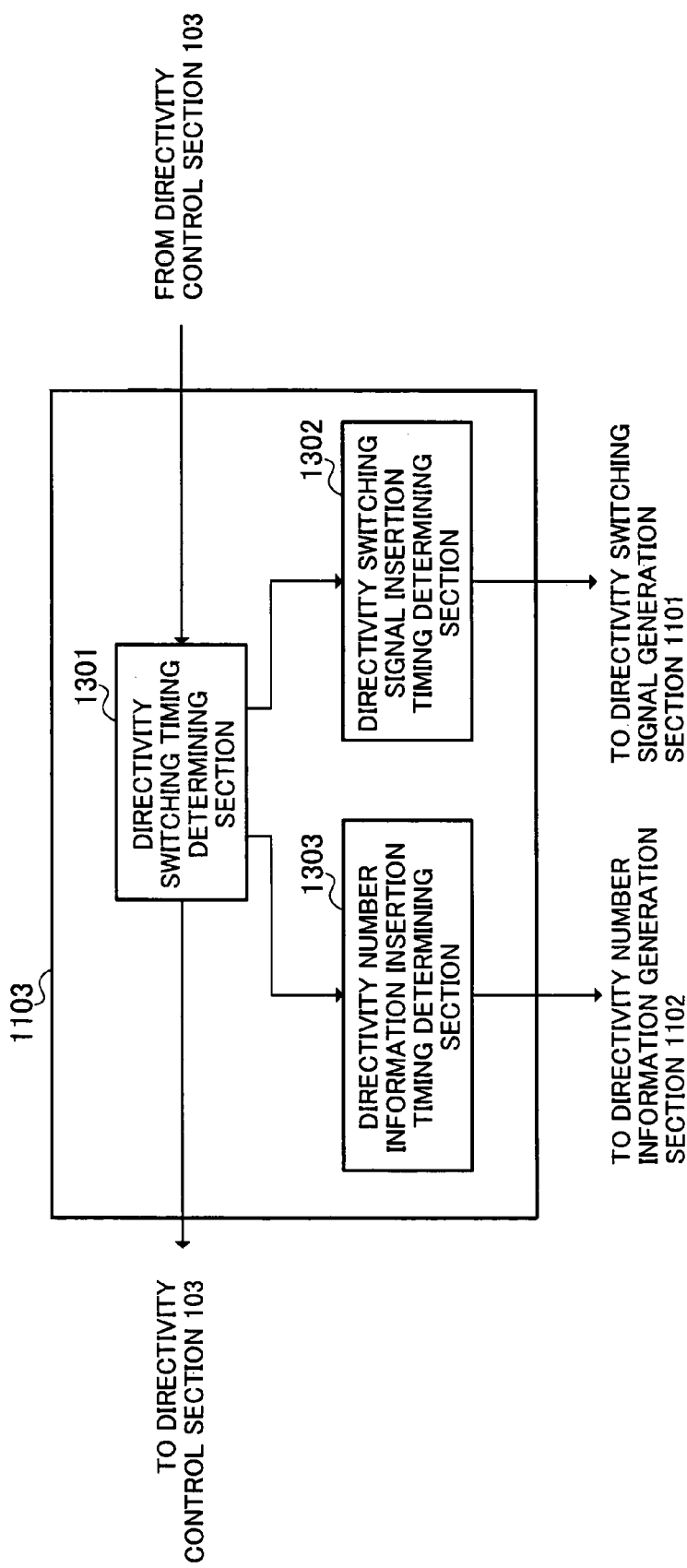
FIG. 13 is a block diagram showing the configuration of a directivity switching instruction section according to Embodiment 3 of the present invention.
Figure 14:
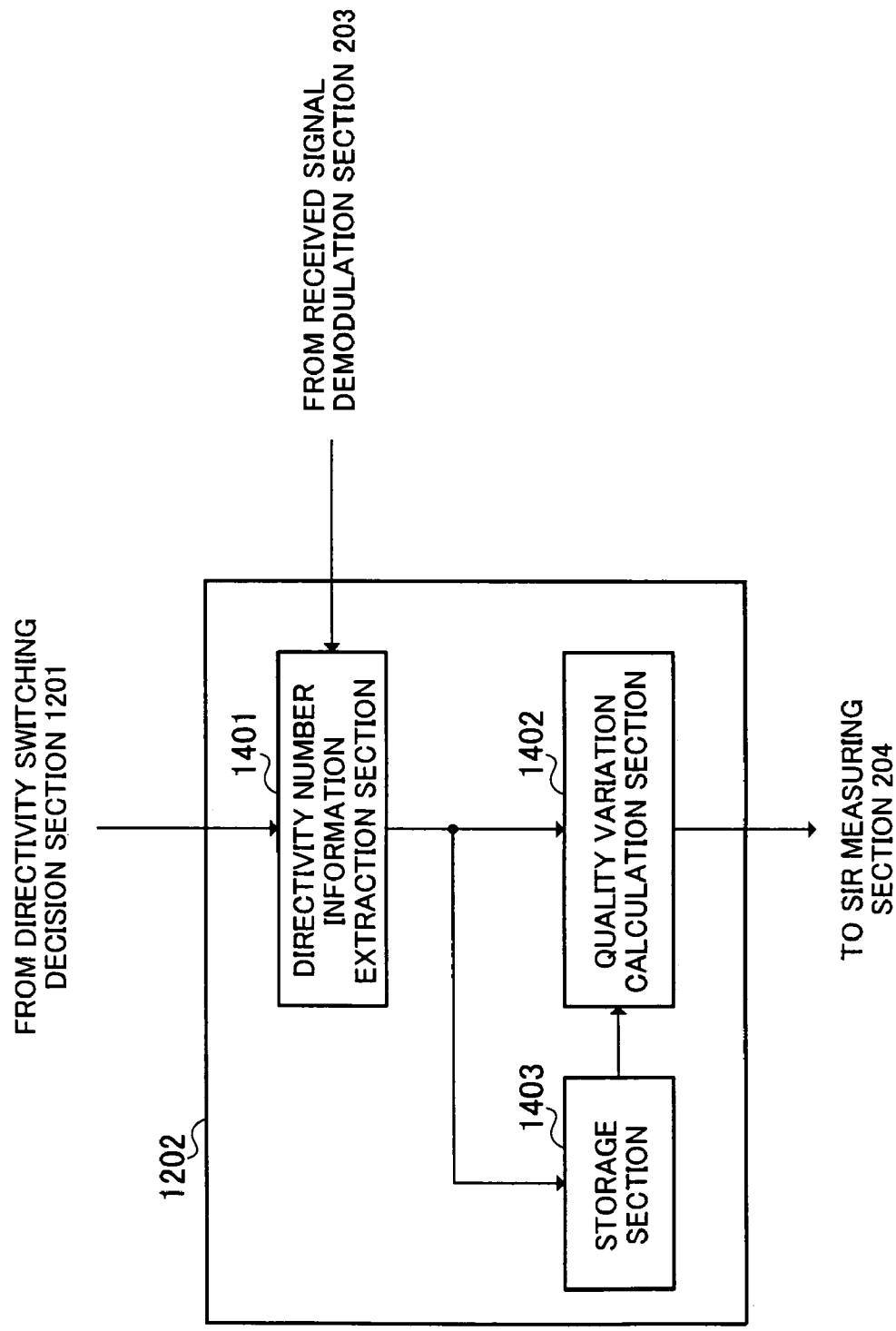
FIG. 14 is a block diagram showing the configuration of a directivity number information decision section according to Embodiment 3 of the present invention.

FIG. 11 illustrates the configuration of a base station apparatus according to Embodiment 3 of the present invention, FIG. 12 illustrates the configuration of a terminal apparatus which is a communication terminal apparatus according to Embodiment 3 of the present invention, FIG. 13 illustrates the configuration of a directivity switching instruction section 1103 according to Embodiment 3 of the present invention and FIG. 14 illustrates the configuration of a directivity number information decision section according to Embodiment 3 of the present invention. This embodiment is characterized in that a base station apparatus notifies a terminal of directivity switching timings and directivity number information. This embodiment differs in FIG. 11 from the embodiment in FIG. 1 in that a directivity switching signal generation section 1101 and a directivity number information generation section 1102 are provided and differs in FIG. 12 from the embodiment in FIG. 2 in that a directivity switching decision section 1201 and a directivity number information decision section 1202 are provided. The same components as those in FIG. 1 and FIG. 2 are assigned the same reference numerals and explanations thereof will be omitted.

A transmission signal generation section 106 modulates packet data or a directivity switching signal input from the directivity switching signal generation section 1101 and a reference signal, etc., including directivity number information input from the directivity number information generation section 1102 and then outputs the packet data and reference signal to a directivity control section 103.

When timing information on the timing for switching between directivities is input from a directivity switching instruction section 1103, the directivity switching signal generation section 1101 generates a directivity switching signal for notifying a terminal of the directivity switching timing and outputs the directivity switching signal to the transmission signal generation section 106. The directivity switching signal is a signal for notifying the terminal that directivities are switched in the slot following the slot including the directivity switching signal.

The directivity number information generation section 1102 generates a directivity number information signal based on information on directivities S1 to S4 which is the directivity number information instructed from the directivity switching instruction section 1103 and outputs the directivity number information signal to the transmission signal generation section 106. Directivities to be switched can be switched in arbitrary order including the case where directivities S1 to S4 are switched in that order. All directivities may be switched the same number of times, but the present invention is not limited to the case where all directivities are switched the same number of times and the present invention can be adapted so that only some directivities may be switched more times than others.

The directivity switching instruction section 1103 determines the timing for switching between directivities from the directivity switching information input from the directivity control section 103 and outputs the determined directivity switching timing information to the directivity control section 103. Furthermore, the directivity switching instruction section 1103 determines to insert a directivity switching signal in the slot immediately preceding the slot where directivity with which packet data is transmitted is switched and outputs the timing information on the insertion of the determined directivity switching signal to the directivity switching signal generation section 1101. Furthermore, the directivity switching instruction section 1103 notifies the switched directivities S1 to S4 to the directivity number information generation section 1102 and instructs the directivity number information generation section 1102 to insert the switched directivity information which is information for notifying the directivities S1 to S4 (switched directivities) with which the next packet data to be switched is transmitted into the transmission signal at the same timing as the timing for inserting the directivity switching signal into the transmission signal. The timing for inserting directivity number information into the transmission signal is not limited to the case where the same timing as the timing for inserting the directivity switching signal is set, but the directivity number information may also be inserted into the transmission signal at a timing different from the timing for inserting the directivity switching signal. The directivity switching instruction section 1103 will be explained more specifically later.

When the received signal input from a received signal demodulation section 203 includes a directivity switching signal for switching the directivity to the slot following the slot including the directivity switching signal, the directivity switching decision section 1201 outputs an instruction for switching to the directivity number information decision section 1202. Furthermore, when outputting the directivity switching signal to the directivity number information decision section 1202, the directivity switching decision section 1201 outputs information on which of directivities S1 to S4 is the next directivity to be switched to the directivity number information decision section 1202.

The directivity number information decision section 1202 references the directivity number information only when an instruction for switching between directivities is received from the directivity switching decision section 1201. Then, the directivity number information decision section 1202 compares the current directivity number with the directivity number after the directivity switching instructed by the directivity switching decision section 1201 in an internal memory (not shown) generates reception quality measuring information for adjusting the measurement result by an amount in the corresponding quality variation between the directivity numbers and outputs the reception quality measuring information generated to an SIR measuring section 204.

When the reception quality measuring information is input from the directivity number information decision section 1202, the SIR measuring section 204 adjusts the SIR measurement result based on the reception quality measuring information and outputs the adjusted SIR measurement result to a transmission signal generation section 205. The SIR measurement result output this time becomes SIR measurement results of the next directivities S1 to S4 to be switched.

Next, the configuration of the directivity switching instruction section 1103 will be explained using FIG. 13. The directivity switching instruction section 1103 is mainly constructed of a directivity switching timing determining section 1301, a directivity switching signal insertion timing determining section 1302 and a directivity number information insertion timing determining section 1303.

The directivity switching timing determining section 1301 determines a timing for switching between directivities from the switching information input from the directivity control section 103 and outputs the timing information for switching the determined directivity to the directivity switching signal insertion timing determining section 1302. The directivity switching timing determining section 1301 also determines the next directivity to be switched and outputs the determined directivity number information to the directivity number information insertion timing determining section 1303.

The directivity switching signal insertion timing determining section 1302 determines to insert a directivity switching signal into the slot immediately preceding the slot where directivities are switched and outputs timing information for inserting the determined directivity switching signal to the directivity switching signal generation section 1101. The timing for switching between directivities is not limited to the case where the directivities are switched in the slot following the slot including the directivity switching signal, but the timing for switching between directivities may also be a timing at which directivities are switched a predetermined number of slots after the slot including the directivity switching signal.

When the directivity number information is input from the directivity switching timing determining section 1301, the directivity number information insertion timing determining section 1303 determines a timing for inserting the directivity number information into the slot immediately preceding the slot where directivities are switched and outputs the timing information for inserting the determined directivity number information to the directivity number information generation section 1102.

Next, the configuration of the directivity number information decision section 1202 will be explained using FIG. 14. The directivity number information decision section 1202 is mainly constructed of a directivity number information extraction section 1401, a quality variation calculation section 1402 and a storage section 1403.

The directivity number information extraction section 1401 extracts directivity number information from a received signal input from the received signal demodulation section 203 and outputs the directivity number information to the quality variation calculation section 1402 and storage section 1403.

When the directivity number information after directivity switching is input from the directivity number information extraction section 1401, the quality variation calculation section 1402 compares the directivity number information with the directivity number information which is the current directivity input from the storage section 1403, calculates a quality variation corresponding to the variation in directivity and outputs the quality variation to the SIR measuring section 204. When the directivity is switched from the directivity S1 to directivity S2, from the directivity S2 to directivity S3 and from the directivity S3 to directivity S4, the quality variation calculation section 1402 is preset to change an SIR measured value by several dB at a time and calculates a variation depending on the range in which directivities are actually switched.

When the directivity number information is input from the directivity number information extraction section 1401, the storage section 1403 stores the directivity number information input as reception quality measuring information. Furthermore, when the directivity number information which is switched directivity information is input from the directivity number information extraction section 1401, the storage section 1403 outputs the latest directivity number information stored so far to the quality variation calculation section 1402.

Next, the operation of the terminal apparatus 1200 will be explained using FIG. 15. The terminal apparatus 1200 which has received a received signal including a reference signal demodulates the received signal at the demodulation section 203 (ST1501).

Next, the directivity switching decision section 1201 decides whether the received signal includes a directivity switching signal or not (ST1502). When the received signal does not include the directivity switching signal, the SIR measuring section 204 measures an SIR from the reference signal (ST1503). On the other hand, in ST1502 when the received signal includes the directivity switching signal, the SIR measuring section 204 measures an SIR corresponding to the quality variation calculated by the directivity number information decision section 1202 (ST1504).

Next, the SIR measuring section 204 outputs the SIR (ST1505) and the transmission signal generation section 205 generates and transmits a transmission signal (ST1506).

Thus, according to this embodiment, in addition to the effects of above described Embodiment 2, it is possible to measure an SIR corresponding to the directivity number information stored beforehand based on the directivity number information included in the received signal, and therefore the terminal apparatus can transmit, before the directivities are switched, the SIR measurement result after directivity switching to the base station apparatus. Furthermore, the base station apparatus can adaptively modulate and code packet data using the SIR measurement result after directivity switching almost simultaneously with the directivity switching, and can thereby select a modulation scheme and coding rate best suited to the channel quality every time and instantaneously even when directivities are frequently switched and make the most of advantages of both the adaptive modulation and adaptive array antenna technology. Furthermore, the terminal apparatus can calculate an SIR based on the directivity number information included in a received signal, and thereby obtain a precise SIR speedily and shorten the processing time.

Embodiments 1 to 3 described above assume that timing for switching between directivities is decided based on a time, but the present invention is not limited to the case where timing for switching between directivities is decided based on a time and it is also possible to decide timing for switching between directivities based on the presence/absence of a terminal which transmits data with urgent priority or positional information on terminal apparatuses indicating in which area more terminals exist, etc. Furthermore, the base station apparatus and terminal according to Embodiments 1 to 3 described above are applicable to both an HSDPA system and a wireless LAN, etc., other than the HSDPA system or also applicable to any system.

As explained above, the present invention can receive packet data with high quality, provide high efficiency for a radio frequency band and maximize the communication path utilization efficiency.

This application is based on the Japanese Patent Application No. 2002-327221 filed on Nov. 11, 2002, entire content of which is expressly incorporated by reference herein.

INDUSTRIAL APPLICABILITY

The present invention is preferably applicable to a base station apparatus and communication terminal apparatus in particular which transmit/receive packet data modulated and coded according to channel quality.

[FIG. 1]
100 BASE STATION APPARATUS
RECEIVED SIGNAL
TRANSMISSION SIGNAL
104 RECEIVED SIGNAL DEMODULATION SECTION
105 SCHEDULER SECTION
106 TRANSMISSION SIGNAL GENERATION SECTION
107 DIRECTIVITY SWITCHING INSTRUCTION SECTION
103 DIRECTIVITY CONTROL SECTION
102-1 RECEPTION RF SECTION
102-n RECEPTION RF SECTION
108-1 TRANSMISSION RF SECTION
108-n TRANSMISSION RF SECTION

[FIG. 2]
200 TERMINAL APPARATUS
RECEIVED SIGNAL
TRANSMISSION SIGNAL
203 RECEIVED SIGNAL DEMODULATION SECTION
204 SIR MEASURING, SECTION
205 TRANSMISSION SIGNAL GENERATION SECTION
202 RECEPTION RF SECTION
206 TRANSMISSION RF SECTION

[FIG. 3]
FROM DIRECTIVITY CONTROL SECTION 103
301 TIMER
302 DIRECTIVITY SWITCHING INSTRUCTION SIGNAL
GENERATION SECTION
TO DIRECTIVITY CONTROL SECTION 103

[FIG. 4]
START
ST401 PREPARE FOR REPETITION AS MANY TIMES AS DIRECTIVITIES

ST1402 TRANSMIT REFERENCE SIGNAL WITH DIRECTIVITY N
ST1403 RECEIVE SIR MEASUREMENT RESULT
ST1404 TRANSMIT CHANNEL USING ADAPTIVE MODULATION WITH DIRECTIVITY N
ST1405 ELAPSED PREDETERMINED TIME?
ST1406 REPEAT AS MANY TIMES AS DIRECTIVITIES
END

[FIG. 6]
RECEIVED SIGNAL
600 BASE STATION APPARATUS
601 DIRECTIVITY SWITCHING SIGNAL GENERATION SECTION TRANSMISSION SIGNAL
104 RECEIVED SIGNAL DEMODULATION SECTION
105 SCHEDULER SECTION
106 TRANSMISSION SIGNAL GENERATION SECTION
602 DIRECTIVITY SWITCHING INSTRUCTION SECTION
103 DIRECTIVITY CONTROL SECTION
102-1 RECEPTION RF SECTION
102-n RECEPTION RF SECTION
108-1 TRANSMISSION RF SECTION
108-n TRANSMISSION RF SECTION

[FIG. 7]
RECEIVED SIGNAL
700 TERMINAL APPARATUS
701 DIRECTIVITY SWITCHING DECISION SECTION
203 RECEIVED SIGNAL DEMODULATION SECTION
204 SIR MEASURING SECTION
205 TRANSMISSION SIGNAL GENERATION SECTION
TRANSMISSION SIGNAL
202 RECEPTION RF SECTION
206 TRANSMISSION RF SECTION

[FIG. 8]
TO DIRECTIVITY CONTROL SECTION 103
801 DIRECTIVITY SWITCHING TIMING DETERMINING SECTION
802 DIRECTIVITY SWITCHING SIGNAL INSERTION TIMING DETERMINING SECTION
FROM DIRECTIVITY CONTROL SECTION 103
TO DIRECTIVITY SWITCHING SIGNAL GENERATION SECTION 601

Figure 9:
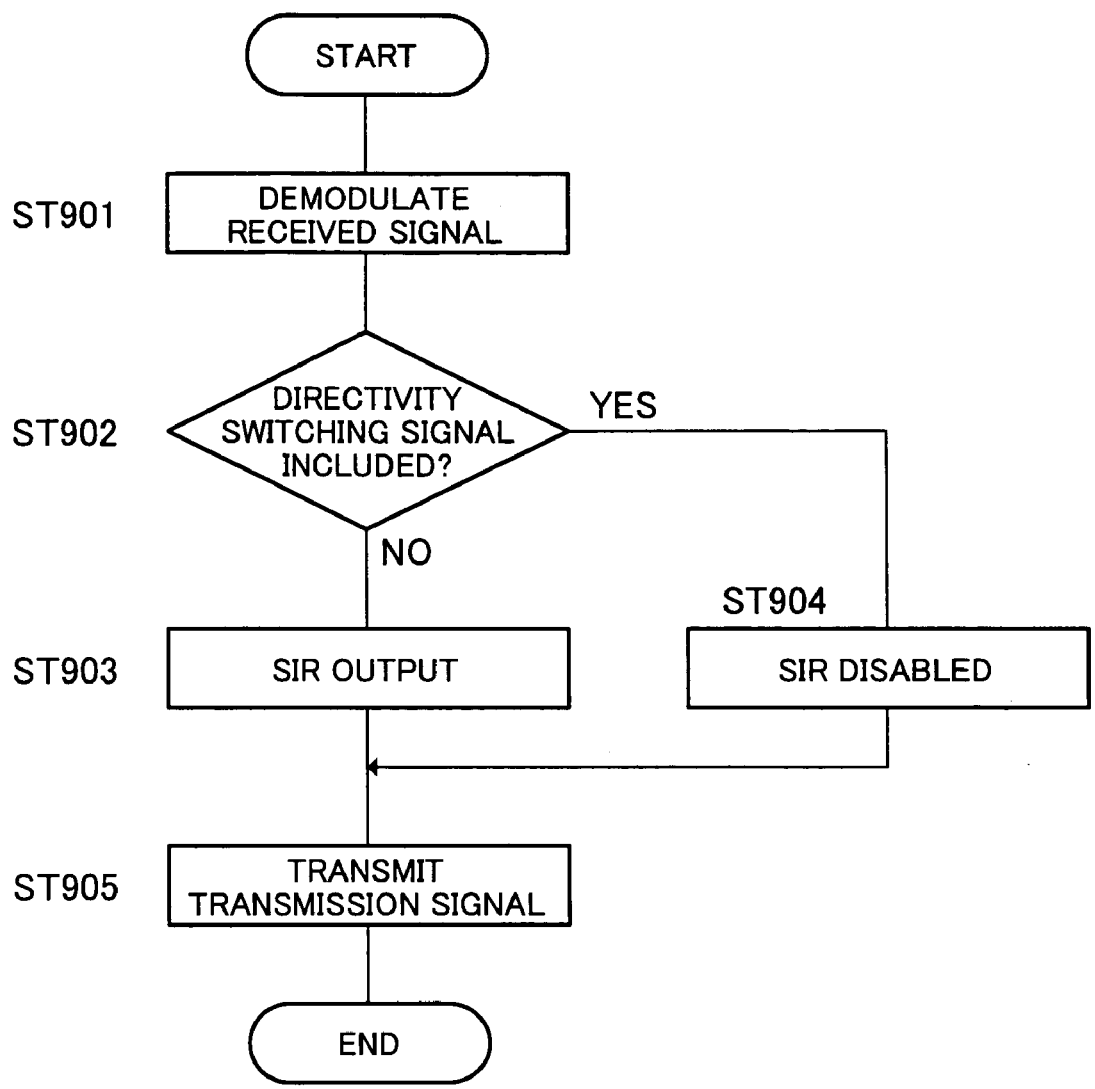
FIG. 9 is a flow chart showing the operation of the communication terminal apparatus according to Embodiment 2 of the present invention.

[FIG. 9]
START
ST901 DEMODULATE RECEIVED SIGNAL
ST902 DIRECTIVITY SWITCHING SIGNAL INCLUDED?
ST903 SIR OUTPUT
ST904 SIR DISABLED
ST905 TRANSMIT TRANSMISSION SIGNAL
END

[FIG. 10]
DIRECTIVITY SWITCHING SIGNAL
SLOT #1
DIRECTIVITY SWITCHING SLOT
1 SLOT
1 SLOT

[FIG. 11]
RECEIVED SIGNAL
1100 BASE STATION APPARATUS
1102 DIRECTIVITY NUMBER INFORMATION GENERATION SECTION
1101 DIRECTIVITY SWITCHING SIGNAL GENERATION SECTION
104 RECEIVED SIGNAL DEMODULATION SECTION
105 SCHEDULER SECTION
106 TRANSMISSION SIGNAL GENERATION SECTION
1103 DIRECTIVITY SWITCHING INSTRUCTION SECTION TRANSMISSION SIGNAL
DIRECTIVITY INFORMATION
103 DIRECTIVITY CONTROL SECTION
102-1 RECEPTION RF SECTION
102-n RECEPTION RF SECTION
108-1 TRANSMISSION RF SECTION
108-n TRANSMISSION RF SECTION

[FIG. 12]
RECEIVED SIGNAL
1200 TERMINAL APPARATUS
1201 DIRECTIVITY SWITCHING DECISION SECTION
1202 DIRECTIVITY NUMBER INFORMATION DECISION SECTION
203 RECEIVED SIGNAL DEMODULATION SECTION
204 SIR MEASURING SECTION
205 TRANSMISSION SIGNAL GENERATION SECTION
TRANSMISSION SIGNAL
202 RECEPTION RF SECTION
206 TRANSMISSION RF SECTION

[FIG. 13]
TO DIRECTIVITY CONTROL SECTION 103
1301 DIRECTIVITY SWITCHING TIMING DETERMINING SECTION
1303 DIRECTIVITY NUMBER INFORMATION INSERTION TIMING DETERMINING SECTION
1302 DIRECTIVITY SWITCHING SIGNAL INSERTION TIMING DETERMINING SECTION
TO DIRECTIVITY NUMBER INFORMATION GENERATION SECTION 1102
TO DIRECTIVITY SWITCHING SIGNAL GENERATION SECTION 1101
FROM DIRECTIVITY CONTROL SECTION 103

[FIG. 14]
FROM DIRECTIVITY SWITCHING DECISION SECTION 1201
1401 DIRECTIVITY NUMBER INFORMATION EXTRACTION SECTION
1403 STORAGE SECTION
1402 QUALITY VARIATION CALCULATION SECTION
TO SIR MEASURING SECTION 204
FROM RECEIVED SIGNAL DEMODULATION SECTION 203

Figure 15:
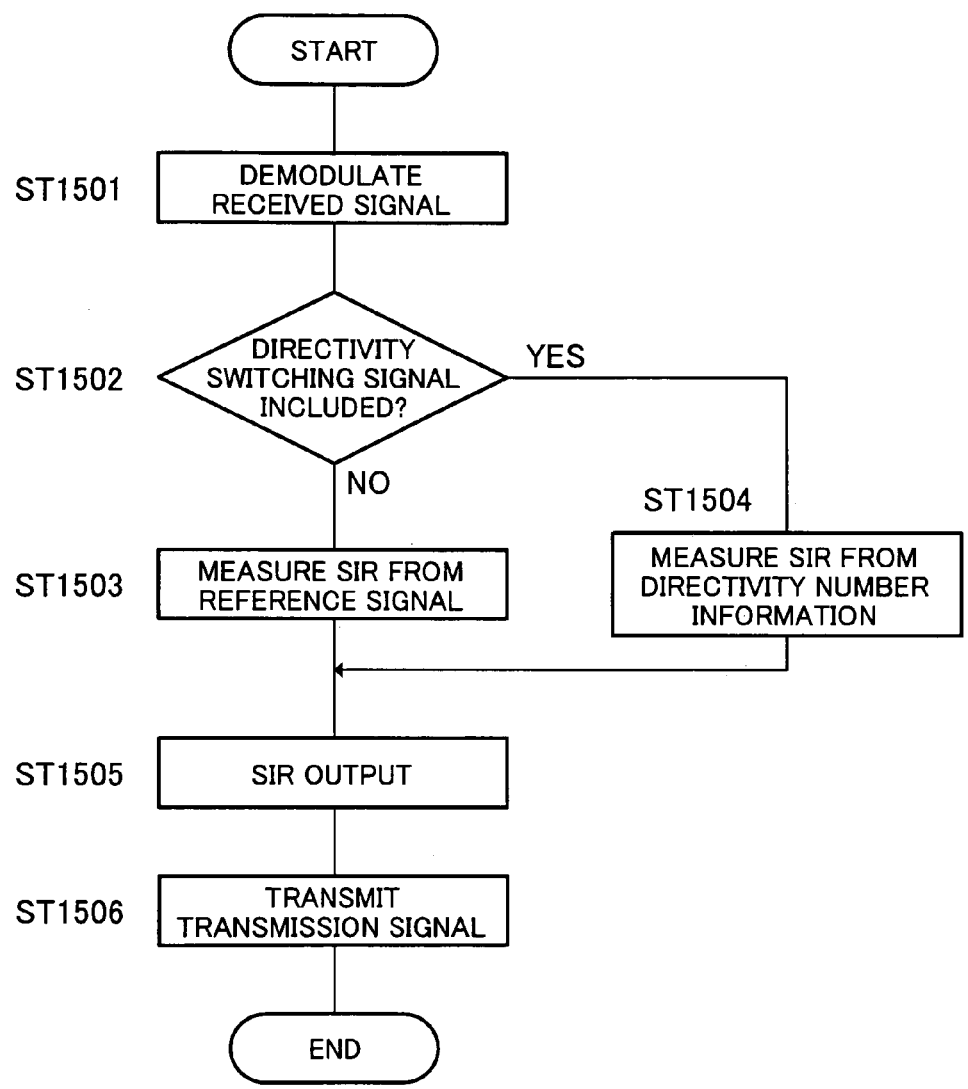
FIG. 15 is a flow chart showing the operation of the communication terminal apparatus according to Embodiment 3 of the present invention.

[FIG. 15]
START
ST1501 DEMODULATE RECEIVED SIGNAL
ST1502 DIRECTIVITY SWITCHING SIGNAL INCLUDED?
ST1503 MEASURE SIR FROM REFERENCE SIGNAL
ST1504 MEASURE SIR FROM DIRECTIVITY NUMBER INFORMATION
ST1505 SIR OUTPUT
ST1506 TRANSMIT TRANSMISSION SIGNAL
END

What is claimed is:
1. A communication terminal apparatus comprising:
a reception quality measuring section that measures reception quality in a directivity of a quality decision signal using the quality decision signal included in a received signal;

a directivity switching decision section that decides a switching timing at which directivities of packet data are switched based on directivity switching timing information reporting a directivity switching timing included in the received signal and instructs the reception quality measuring section to nullify the reception quality measured using the quality decision signal received in a period from a time a predetermined time ahead of the switching timing to the switching timing; and a transmission section that transmits reception quality information indicating the reception quality measured using the reception quality decision signal received at a timing other than the period from the time the predetermined time ahead of the switching timing to the switching timing.

2. The communication terminal apparatus according to claim 1, wherein the directivity switching decision section decides a second slot following a first slot including the directivity switching timing information as the switching timing and instructs the reception quality measuring section to nullify the reception quality measured using the quality decision signal received in the first slot that is the period from the time the predetermined time ahead of the switching timing to the switching timing.

3. A base station apparatus communicating with the communication terminal apparatus according to claim 1, the base station apparatus comprising:

a directional transmission section that transmits packet data and a quality decision signal with a directivity;

a packet data generation section that adaptively modulates or codes the packet data based on the quality information;

a transmission section that transmits the directivity switching timing information; and a control section that carries out control to switch directivities with which the packet data is transmitted after transmitting the directivity switching timing information.

4. The communication terminal apparatus according to claim 1, further comprising a storage section that prestores reception quality measuring information for each directivity, wherein the reception quality measuring section measures the reception quality using switched directivity information included in the received signal, the switched directivity information being a next directivity to be switched for transmitting packet data, and the reception quality measuring information.

5. The base station apparatus according to claim 3, wherein:

the transmission section transmits switched directivity information to a communicating party, the switched directivity information being a next directivity to be switched for transmitting packet data;

the packet data generation section adaptively modulates or codes packet data based on the quality information in the switched directivity; and the control section transmits the packet data with the switched directivity.

6. A reception quality reporting method comprising the steps of:

at a communication terminal apparatus, measuring reception quality in a directivity of a quality decision signal using the quality decision signal included in a received signal received from a base station apparatus, deciding a switching timing at which directivities of packet data are switched based on directivity switching timing information reporting a directivity switching timing included in the received signal, and nullifying the reception quality measured using the reception quality decision signal received in a period from a time a predetermined time ahead of the switching timing to the switching timing; and transmitting, from the communication terminal apparatus to the base station apparatus, reception quality information indicating the reception quality measured using the quality decision signal received at a timing other than the period from the time the predetermined time ahead of the switching timing to the switching timing.

7. The reception quality reporting method according to claim 6, further comprising, deciding a second slot following a first slot including the directivity switching timing information as the switching timing, and nullifying the reception quality measured using the quality decision signal received in the first slot that is the period from the time the predetermined time ahead of the switching timing to the switching timing.

* * * * *